(12) United States Patent
Shie et al.

(10) Patent No.: US 11,287,371 B2
(45) Date of Patent: Mar. 29, 2022

(54) GAS ABSORPTION SPECTRUM MEASURING SYSTEM AND MEASURING METHOD THEREOF

(71) Applicant: INDUSTRIAL TECHNOLOGY RESEARCH INSTITUTE, Hsinchu (TW)

(72) Inventors: Ruei-Hao Shie, Zhudong Township (TW); Bo-Kai Chen, Taoyuan (TW); Lung-Yu Sung, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 17/087,013

(22) Filed: Nov. 2, 2020

(65) Prior Publication Data
US 2021/0172868 A1   Jun. 10, 2021

(30) Foreign Application Priority Data
Dec. 6, 2019   (TW) .................................. 108144672

(51) Int. Cl.
*G01N 21/3504* (2014.01)
*G01L 19/00* (2006.01)

(52) U.S. Cl.
CPC ...... *G01N 21/3504* (2013.01); *G01L 19/0092* (2013.01); *G01N 2201/0636* (2013.01);
(Continued)

(58) Field of Classification Search
CPC .................................................... G01N 1/3504
See application file for complete search history.

(56) References Cited

U.S. PATENT DOCUMENTS

| 6,615,142 B1 * | 9/2003 | Hovde | .................... G06F 17/10 |
| | | | 702/30 |
| 7,943,915 B2 | 5/2011 | Liu et al. | |

(Continued)

FOREIGN PATENT DOCUMENTS

| CN | 102590138 A | 7/2012 |
| CN | 107589084 A | 1/2018 |
| TW | 1245115 B | 12/2005 |

OTHER PUBLICATIONS

Cieszczyk, "A Local Model and Calibration Set Ensemble Strategy for Open-Path FTIR Gas Measurement With Varying Temperature", Metrology and Measurement Systems, vol. XX, No. 3, vol. XX, pp. 513-524.

(Continued)

*Primary Examiner* — Edwin C Gunberg
(74) *Attorney, Agent, or Firm* — Birch, Stewart, Kolasch & Birch, LLP

(57) ABSTRACT

A gas absorption spectrum measuring system, including a light source, a light source controller, a light intensity detector and a computing module is provided. The light source emits a light. The light source controller regulates a wavelength of the light. The light intensity detector detects an intensity of the light which is generated by the light source and passes through at least one target gas. The computing module includes a numerical processor and a storage unit. The storage unit stores a spectral database. The numerical processor fits an absorption spectrum of the at least one target gas and a standard spectrum in the spectral database, performs a similarity comparison operation to obtain a temperature and a pressure of the at least one target gas with a minimum residual value, and determines a species concentration of the at least one target gas according to the minimum residual value.

14 Claims, 7 Drawing Sheets

(52) U.S. Cl.
CPC .............. *G01N 2201/06113* (2013.01); *G01N 2201/12753* (2013.01)

(56) References Cited

U.S. PATENT DOCUMENTS

| | | |
|---|---|---|
| 8,155,890 B2 | 4/2012 | Goto et al. |
| 8,970,842 B2 | 3/2015 | Sun et al. |
| 9,360,415 B2 | 6/2016 | Liu et al. |
| 9,772,277 B2 | 9/2017 | Muramatsu et al. |

OTHER PUBLICATIONS

Gordon et al., "The HITRAN2016 molecular spectroscopic database", journal of Quantitative Spectroscopy & Radiative Transfer, 000, 2017, pp. 1-66.

Kosterev et al., "Application of quantum cascade lasers to trace gas analysis", Applied Physics B—Laser and Optics, vol. 90, 2008, pp. 165-176.

Tashkun et al., "CDSD-1000, the high-temperature carbon dioxide spectroscopic databank", Journal of Quantitative Spectroscopy & Radiative Transfer, vol. 82, 2003, pp. 165-196.

Uddi et al., "Temperature measurements in a rapid compression machine using mid-infrared H2O absorption spectroscopy near 7.6μm", Applied Optics, vol. 51, No. 22, Aug. 1, 2012, pp. 5464-5476.

Zhang et al., "Study on Online Self-Calibration Technique for Trace Gas Analyzer Based on Tunable Diode Laser Absorption Spectroscopy", Spectroscopy and Spectral Analysis, vol. 30, No. 4, Apr. 2010, pp. 1030-1034.

Zhu et al., "TDLAS Monitoring of Carbon Dioxide with Temperature Compensation in Power Plant Exhausts", Applied Sciences, vol. 9, 422, 2019, pp. 1-15.

\* cited by examiner

| E | 0.90 atm | 0.95 atm | 1.00 atm | 1.05 atm | 1.10 atm |
|---|---|---|---|---|---|
| 278 K | -0.00009 | -0.00045 | -0.00081 | -0.00116 | -0.00151 |
| 288 K | 0.00004 | -0.00032 | -0.00067 | -0.00102 | -0.00137 |
| 298 K | 0.00019 | -0.00016 | -0.00051 | -0.00086 | -0.00120 |
| 308 K | 0.00035 | 0.00000 | -0.00035 | -0.00069 | -0.00103 |
| 318 K | 0.00051 | 0.00016 | -0.00018 | -0.00052 | -0.00086 |

| $N_2O$ modified concentration coefficient | | | | | |
|---|---|---|---|---|---|
| a | 0.90 atm | 0.95 atm | 1.00 atm | 1.05 atm | 1.10 atm |
| 278 K | 0.84 | 0.82 | 0.81 | 0.80 | 0.79 |
| 288 K | 0.89 | 0.87 | 0.86 | 0.85 | 0.84 |
| 298 K | 0.94 | 0.93 | 0.91 | 0.90 | 0.89 |
| 308 K | 0.99 | 0.98 | 0.96 | 0.95 | 0.94 |
| 318 K | 1.04 | 1.03 | 1.01 | 1.00 | 0.99 |
| CO modified concentration coefficient | | | | | |
| b | 0.90 atm | 0.95 atm | 1.00 atm | 1.05 atm | 1.10 atm |
| 278 K | 2.16 | 2.27 | 2.36 | 2.45 | 2.53 |
| 288 K | 1.59 | 1.69 | 1.79 | 1.87 | 1.95 |
| 298 K | 1.12 | 1.22 | 1.32 | 1.40 | 1.48 |
| 308 K | 0.75 | 0.85 | 0.93 | 1.02 | 1.09 |
| 318 K | 0.46 | 0.54 | 0.63 | 0.71 | 0.78 |
| $H_2O$ modified concentration coefficient | | | | | |
| c | 0.90 atm | 0.95 atm | 1.00 atm | 1.05 atm | 1.10 atm |
| 278 K | 2.08 | 2.02 | 1.96 | 1.90 | 1.85 |
| 288 K | 1.63 | 1.58 | 1.54 | 1.49 | 1.45 |
| 298 K | 1.29 | 1.25 | 1.22 | 1.18 | 1.15 |
| 308 K | 1.03 | 1.00 | 0.97 | 0.94 | 0.92 |
| 318 K | 0.83 | 0.81 | 0.78 | 0.76 | 0.74 |

FIG. 6

GAS ABSORPTION SPECTRUM MEASURING SYSTEM AND MEASURING METHOD THEREOF

This application claims the benefit of Taiwan application Serial No. 108144672, filed Dec. 6, 2019, the disclosure of which is incorporated by reference herein in its entirety.

TECHNICAL FIELD

The disclosure relates in general to a measuring system and a measuring method thereof, and more particularly to a gas absorption spectrum measuring system and a measuring method thereof.

BACKGROUND

When performing gas detection, the open-path infrared spectrometer performs quantitative analysis using an experimental standard spectrum under the condition of 25° C. and an atmospheric pressure. When the ambient temperature, pressure and humidity change significantly, the fitting error between the standard spectrum and the actual spectrum will be increased.

Besides, the pressure and temperature influence on an infrared spectrum is simulated using a high-resolution transmission molecular absorption database (HITRAN), and the simulation result shows that when the condition of temperature or pressure of the gases changes, the infrared spectra of the gases with the same concentration will change accordingly, and the variation thereof will be obvious as the spectrum resolution of the gases increases.

Also, when performing gas detection, the conventional open-path infrared spectrometer, in the absence of the variation in the characteristic peak of the infrared spectrum caused by the change in ambient temperature and atmospheric pressure, can only calculate relative concentrations of the atmosphere gases at different time points. In comparison to the conventional infrared spectrometer, the quantum cascade lasers (QCL) possesses higher intensity and higher resolution, and therefore has better performance in the recognition of gas species of the infrared spectrum. However, the QCL is disadvantaged by having a significant error in the infrared spectrum as temperature or pressure changes, and still needs to be improved.

SUMMARY

The disclosure is directed to a gas absorption spectrum measuring system and a measuring method thereof, wherein the high-resolution gas standard spectra, a matrix database and an algorithm under the condition of different temperatures and pressures are created through a simulation database and/or an experiment platform to perform qualitative and quantitative analysis and calculation of multiple gases. Additionally, the disclosure can immediately modify the deviation in the calculation of gas concentration generated due to the change in different temperatures or pressures of multiple co-existing gases to achieve a high stable open-path optical path system and can meet the requirement of correcting the temperature and pressure effect of high-resolution spectrum.

According to one embodiment, a gas absorption spectrum measuring system is provided. The system includes a light source, a light source controller, a light intensity detector and a computing module. The light source is configured to emit a light. The light source controller is configured to regulate a wavelength of the light. The light intensity detector is configured to detect an intensity of the light which is generated by the light source and passes through at least one target gas. The computing module includes a numerical processor and a storage unit. The storage unit is configured to store a spectral database. The numerical processor is configured to fit an absorption spectrum of the at least one target gas and a standard spectrum in the spectral database, to perform a similarity comparison operation to obtain a temperature and a pressure of the at least one target gas with a minimum residual value, and to determine a species concentration of the at least one target gas according to the minimum residual value of the at least one target gas.

According to another embodiment, a gas absorption spectrum measuring method is provided. The method includes the following steps. A spectral database is set up in a computing module. A light intensity passing through at least one target gas is obtained by a spectrometer. A mixed spectrum of the at least one target gas and a standard spectrum in the spectral database are fit, and a similarity comparison operation is performed to obtain a temperature and a pressure of the at least one target gas with a minimum residual value. A species concentration of the at least one target gas is determined according to the minimum residual value of the at least one target gas.

The above and other aspects of the disclosure will become better understood with regard to the following detailed description of the preferred but non-limiting embodiment(s). The following description is made with reference to the accompanying drawings.

BRIEF DESCRIPTION OF THE DRAWINGS

FIG. 5 is a schematic diagram of obtaining a temperature and a pressure of the at least one target gas with a minimum residual value according to an embodiment of the disclosure.

FIG. 6 is a schematic diagram of obtaining a modified concentration coefficient of each of the target gases $N_2O$, CO, and $H_2O$ according to the temperature and the pressure obtained in FIG. 5.

Figure 1:
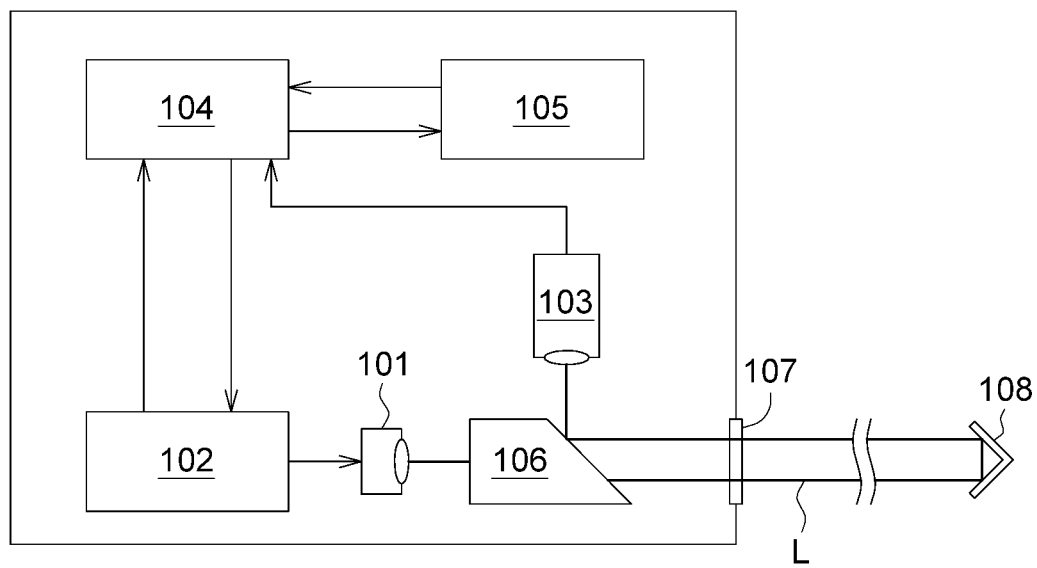
FIG. 1 is a schematic diagram of an open-path gas absorption spectrum measuring system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Detailed descriptions of the disclosure are disclosed below with a number of embodiments. However, the disclosed embodiments are for explanatory and exemplary purposes only, not for limiting the scope of protection of the disclosure. Similar/identical designations are used to indicate similar/identical elements. Directional terms such as above, under, left, right, front or back are used in the following embodiments to indicate the directions of the accompanying drawings, not for limiting the disclosure.

According to an embodiment of the disclosure, a gas absorption spectrum measuring system and a measuring method thereof are provided. For example, a high-resolution gas standard spectrum under the condition of different temperatures and pressures is created using the simulation based on a HITRAN database and/or using an optical experiment platform, and is used to analyze the absorption spectrum under the co-existence of multiple gases and fit an absorption spectrum of the target gas and a standard spectrum under the condition of different temperatures and pressures. Then, linear regression analysis is performed using a multivariate least squares method to obtain an optimum solution and immediately modify the deviation in the calculation of gas concentration generated due to the change in different temperatures or different pressures under the co-existence of multiple gases. Then, a species concentration of each target gas in the mixed spectrum can be obtained by multiplying the modified concentration coefficient with a concentration value of each target gas in the spectral database. The multivariate least square method is such as the classic least square method or the partial least square method.

When performing gas detection using a conventional open-path infrared spectrometer, both the water molecules and particles in the atmosphere affect the intensity of the reflected light. Therefore, when setting up a spectral database, the water molecules and the target gas in the atmosphere needs to be taken into consideration, and the temperature-pressure matrix of the spectral database is set up using all factors affecting the absorption spectrum (includes temperature, pressure, the water molecules and the target gas in the atmosphere).

Moreover, during gas detection, the wavenumber range selects a quantitative interval of the target gas that covers the absorption peak areas of all target gases. The wavenumber W is defined as a reciprocal of the wavelength $\lambda$, that is, $W=1/\lambda$, and the unit is $cm^{-1}$. Actually, the wavenumber is measured by the number of crests or troughs of wave within 1 cm.

Within a specific concentration range, the concentration and the absorption strength of the gas form a linear relation according to the Beer's law. Thus, the absorption strength (A) of the gas is positively proportional to the absorption coefficient ($\alpha$), the optical path length (l) and the concentration (c), and the relation can be expressed as: $A=\alpha l c$, wherein $\alpha$ represents an absorption coefficient (also referred as an absorptivity), and can also be referred as an extinction coefficient (k). Given that the optical path length (l) is in the unit of cm, the concentration (c) is in the unit of molarity M, and the absorption coefficient ($\alpha$) is in the unit of $M^{-1} cm^{-1}$, the absorption coefficient can be referred as a molar absorption coefficient (molar absorptivity) represented by $\varepsilon$.

Also, the relation between the gas concentration and the absorption strength can be expressed as: $A=K_\lambda C$, wherein $K_\lambda$ represents a gas concentration coefficient. Under the co-existence of multiple gases, the absorption strengths $A_{\lambda 1}$ and $A_{\lambda 2}$ of the gases with wavenumbers $\lambda 1$ and $\lambda 2$ can respectively be expressed as: $A_{\lambda 1}=K_{a,\lambda 1}C_a+K_{b,\lambda 1}C_b+E_{\lambda 1}$, $A_{\lambda 2}=K_{a,\lambda 2}C_a+K_{b,\lambda 2}C_b+E_{\lambda 2}$.

Referring to FIG. 1, a schematic diagram of an open-path gas absorption spectrum measuring system 100 according to an embodiment of the disclosure is shown. The gas absorption spectrum measuring system 100 includes a light source 101, a light source controller 102, a light intensity detector 103, an analog-to-digital converter 104, a computing module 105, an elliptical parabolic mirror 106, an optical lens window 107 and a reflector 108. The light source 101 is configured to emit a light. The light source controller 102 is configured to regulate a wavelength of the light from the light source 101. The light intensity detector 103 is configured to detect an intensity of the light which is generated by the light source 101 and passes through at least one target gas. The analog-to-digital converter 104 is configured to convert an electric signal into an analog signal or a digital signal. The computing module 105 includes a numerical processor and a storage unit. The storage unit is configured to store a spectral database. The numerical processor is configured to fit an absorption spectrum of the at least one target gas and a standard spectrum in the spectral database and perform a similarity comparison operation, and to determine a temperature, a pressure and a species concentration of the at least one target gas. The optical lens window 107 is an optical glass that can be penetrated by a light L emitted from the light source 101, and is configured to protect and prevent the internal components of the measuring system from being polluted by particles to assure that the measurement result is not affected by the gases in the system. In an embodiment, the optical lens window 107 is coated with an anti-reflective material against the light of a specific wavelength range, and therefore effectively reduces the interference caused by the optical lens window 107. The light L can pass through the via hole of the elliptical parabolic mirror 106 and the optical window 107 to reach the reflector 108. After the light L is reflected by the reflector 108, the light L is further total reflected by the elliptical parabolic mirror 106 to reach the light intensity detector 103. In another embodiment, the reflector 108 may face the light intensity detector 103 and directly reflect the light L emitted from the light source 101 to the light intensity detector 103. In an alternate embodiment, the light intensity detector 103 faces the light source 101 and directly receives the light L emitted from the light source 101.

The light source 101 includes one of the following light emitting elements: Fourier transform infrared spectrometer (FTIR), tunable diode laser (TDLS), tunable semiconductor laser, quantum cascade laser (QCL), interband cascade laser (ICL), vertical cavity surface emitting laser (VCSEL), horizontal cavity surface emitting laser (HCSEL), distributed feedback laser, light emitting diode (LED), super-luminescent diode, amplified spontaneous emission source (ASE source), gas discharge laser, liquid laser, solid state laser, fiber laser, color center laser, incandescent lamp, discharge lamp, thermal emitter, frequency comb or a device capable of generating frequency tunable light through nonlinear optical interactions.

The light intensity detector 103 includes one of the following elements: InGaAs detector, InAs detector, InP detector, silicon detector, SiGe detector, germanium detector, Mercury Cadmium Telluride (MCT) detector, PbS detector, PbSe detector, thermopile detector, multi-element array detector, single element detector or photo-multiplier.

In an embodiment, the spectral database is set up based on a HITRAN database and is stored in the computing module 105. The HITRAN database is configured to obtain simulation signals of infrared spectra under the condition of different temperatures or different pressures to set up standard spectra of multiple gases. In another embodiment, the spectral database is obtained by extracting the absorption spectrum of the corresponding target gas in the gas sample tank 109 (refer to FIG. 2) under the condition of a constant temperature, a constant pressure and a concentration of the at least one target gas, and is stored in the computing module 105.

Line by line (LBL) is a monochromatic radiation transfer mode. Each time when the radiation flux of each gas in the atmosphere is calculated using single wavenumber, the absorption coefficient of the gas can be calculated in the LBL mode by reading the data of the absorption spectrum and setting the wavenumber range. The calculation of the LBL absorption coefficient can be expressed as: $k_v(p, \theta) = \Sigma S_i(\theta) f_{i,v}(p, \theta)$, wherein k represents an absorption coefficient; the subscript v represents a wavenumber (cm$^{-1}$); p represents a pressure (hPa); $\theta$ represents a temperature (K); $S_i(\theta)$ represents a strength of the i$^{th}$ absorption line; and $f_{i,v}(p, \theta)$ represents a shape parameter of an absorption line. Information of the parameters such as the position and strength of the absorption line of a gas can be obtained from the HITRAN database or can be extracted from a real-time spectrum at the laboratory under a controlling condition of temperature and pressure. With respect to the gas that cannot be provided by the HITRAN database, a standard spectrum database can be obtained using the gas sample tank 109 whose temperature and pressure are controlled at the laboratory. Alternatively, the standard spectrum database, such as the high-resolution standard spectrum under the condition of different temperatures created by the Pacific Northwest National Laboratory (PNNL), can be obtained through purchase.

In terms of the HITRAN simulation, the pressure condition for each target gas is: 20,000 ppm for H$_2$O, 0.15 ppm for CO and 0.33 ppm for N$_2$O. The temperature condition is ranged between 0-50° C., and the pressure condition is ranged between 1.5-0.5 atmospheric pressures (atm). Since the above parameters meet the conditions of concentration, temperature and pressure of existing gases in an ordinary atmosphere, the standard spectrum database using the above parameters will match the conditions in the actual environment.

Figure 2:
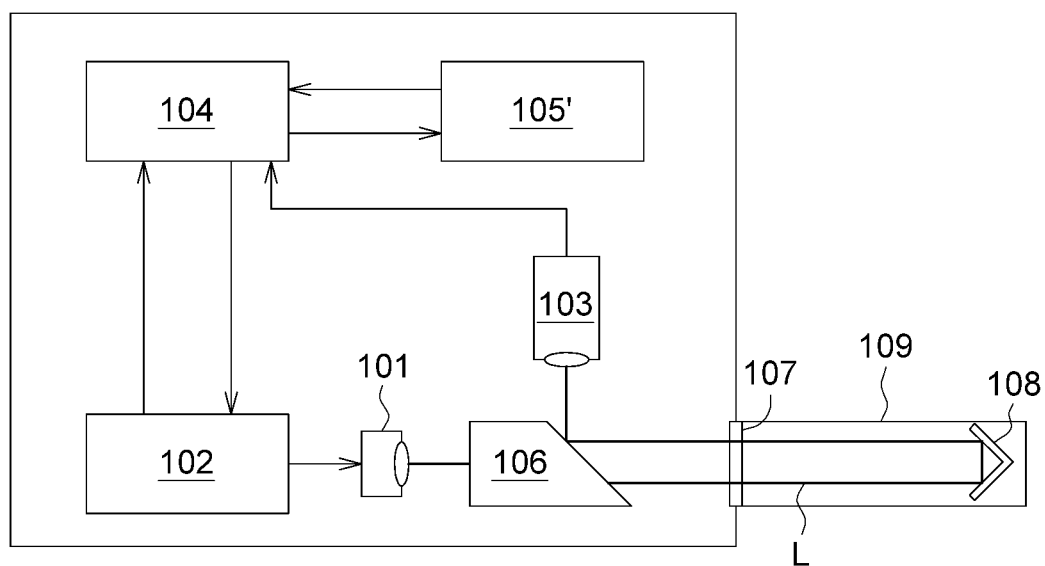
FIG. 2 is a schematic diagram of an experiment platform of gas absorption spectrum for setting up a spectral database according to an embodiment of the disclosure.

In terms of the standard spectrum obtained in the laboratory, the light source 101 is a laser light or other collimated light; the gas sample tank 109 is a stainless cavity whose optical path length is 50 cm; the optical lens window 107 is a silicon mirror window whose thickness is 5 mm, but the disclosure is not limited thereto. Referring to FIG. 2, a schematic diagram of an experiment platform 100' for obtaining a spectral database of gases in sealed tank according to an embodiment of the disclosure is shown. The experiment platform 100' includes a light source 101, a light source controller 102, a light intensity detector 103, an analog-to-digital converter 104, a computing unit 105', an elliptical parabolic mirror 106, an optical lens window 107, a reflector 108 and a gas sample tank 109. The properties and functions of the light source 101, the light source controller 102, the light intensity detector 103, the analog-to-digital converter 104, the elliptical parabolic mirror 106, the optical lens window 107 and the reflector 108 are as indicated in FIG. 1, and are not repeated here. However, the experiment platform 100' of FIG. 2 is different from that of FIG. 1 in that the computing unit 105' is configured to convert a measured data into a spectrum for setting up a standard spectrum database. Moreover, the gas sample tank 109 is configured to store a gas and control the concentration, temperature and pressure of the gas to assure that the measurement result is not affected by gases out of the system.

Figure 3A:
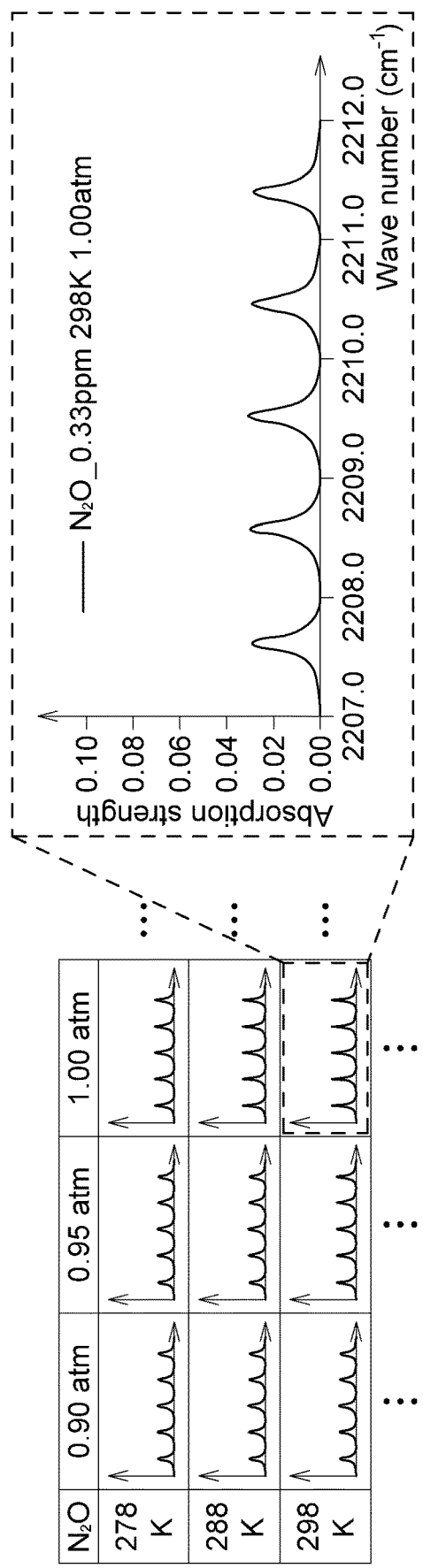
FIG. 3A is a schematic diagram of a standard spectrum of target gas $N_2O$ in a temperature-pressure matrix of a spectral database according to an embodiment of the disclosure.
Figure 3B:
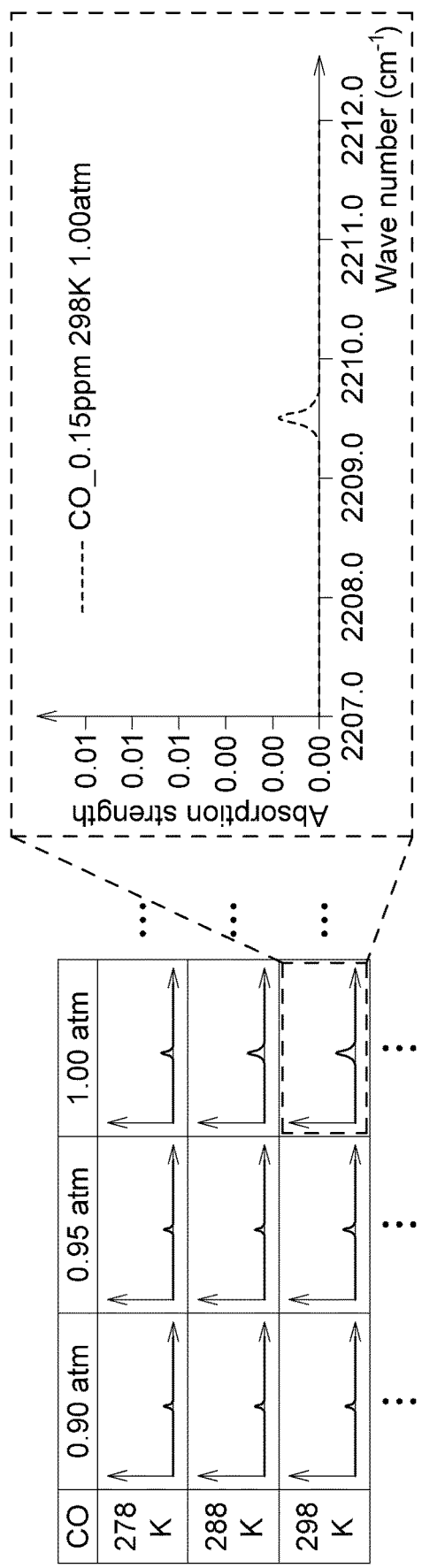
FIG. 3B is a schematic diagram of a standard spectrum of target gas CO in a temperature-pressure matrix of a spectral database according to an embodiment of the disclosure.
Figure 3C:
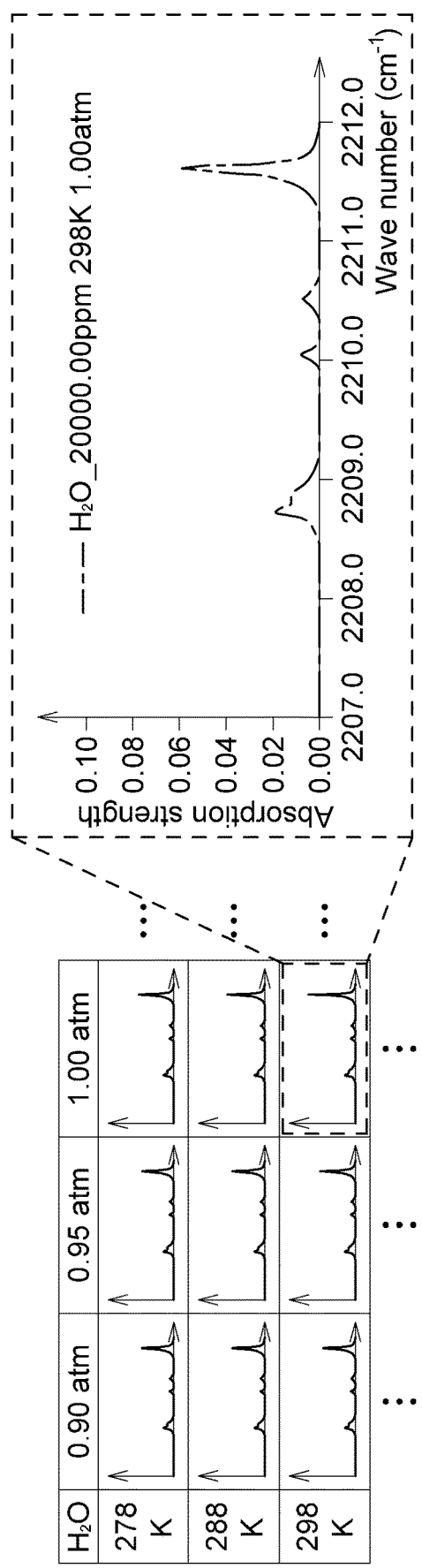
FIG. 3C is a schematic diagram of a standard spectrum of target gas $H_2O$ in a temperature-pressure matrix of a spectral database according to an embodiment of the disclosure.

Referring to FIGS. 3A-3C, schematic diagrams of absorption spectra of target gases (such as N$_2$O, CO and H$_2$O) under the condition of different temperatures and pressures are respectively shown, wherein the horizontal axis represents a wavenumber range (2207-2212 cm-1), and the vertical axis represents a corresponding absorption strength per each wavenumber.

Figure 4A:
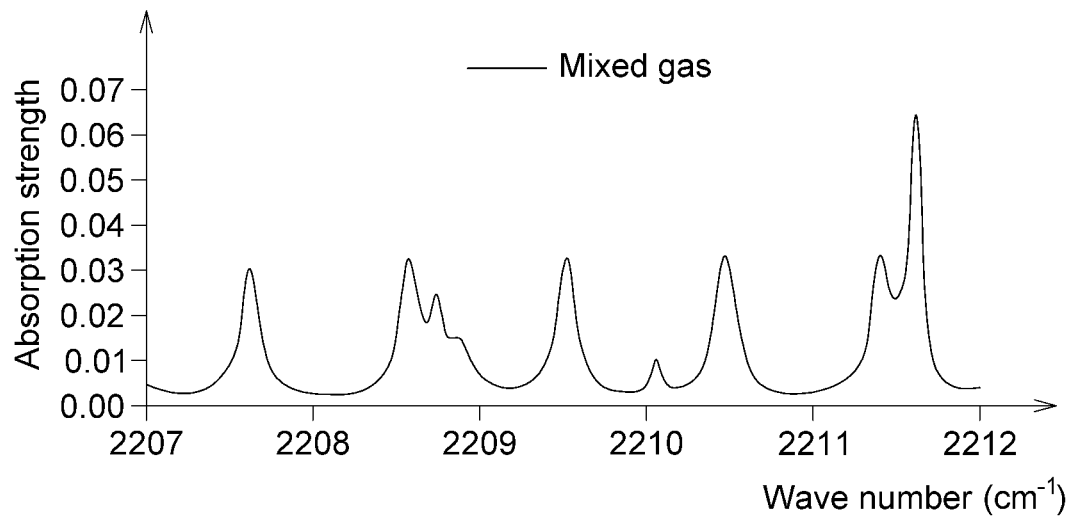
FIG. 4A is a schematic diagram of absorption spectra of target gases $N_2O$, CO, and $H_2O$ according to an embodiment of the disclosure.
Figure 4B:
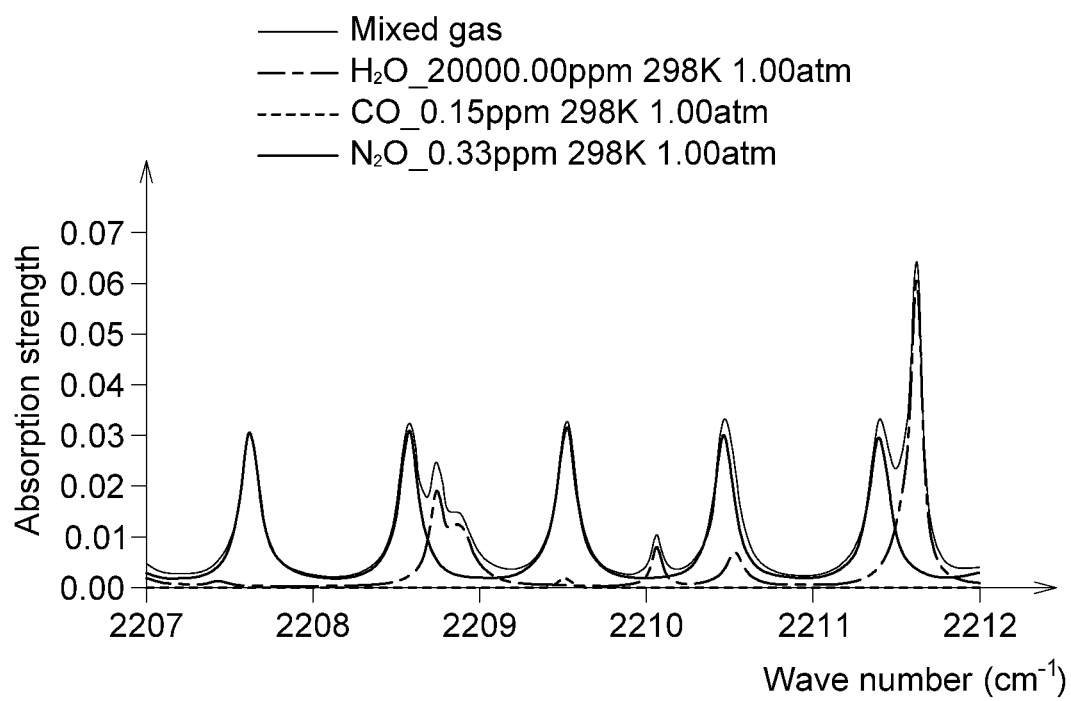
FIG. 4B is a schematic diagram of fitting the absorption spectra of target gases $N_2O$, CO, and $H_2O$ and the standard spectra in the spectral database according to an embodiment of the disclosure.

Refer to FIGS. 4A and 4B. FIG. 4A is a schematic diagram of absorption spectra of target gases N$_2$O, CO, and H$_2$O according to an embodiment of the disclosure. FIG. 4B is a schematic diagram of fitting the absorption spectra of target gases N$_2$O, CO, and H$_2$O and a standard spectrum in the spectral database according to an embodiment of the disclosure. The mixed gas spectra of FIG. 4A and the standard spectra of FIGS. 3A-3C are fitted and a similarity comparison operation is performed, that is, the higher the similarity, the smaller the residual value; conversely, the lower the similarity, the larger the residual value. The residual value can be calculated as follows. The curve diagrams of each standard spectra under the condition of different temperatures and pressures are fitted to curve diagram of the mixed gas spectra, multiple residual values are obtained using linear least squares regression analysis, and a minimum residual value is obtained from the multiple residual values. Firstly, let the absorption strength of mixed gas be expressed as: y=ax1(P,T)+bx2(P,T)+cx3(P,T)+E, wherein y, x1, x2, x3 respectively represent the absorption strengths of the mixed gas and target gases N$_2$O, CO and H$_2$O under the condition of specific temperature T and pressure P; a, b and c represent each of absorption coefficients of N$_2$O, CO and H$_2$O; E represents a residual value; the pressure conditions respectively are 0.9 atm, 0.95 atm and 1.0 atm; the temperature conditions respectively are 278K, 288K and 298 K, but the disclosure is not limited thereto. When the residual value (E) is near 0, the optimum solution of the above equation can be found and can be used to obtain absorption coefficients a, b and c of target gases N$_2$O, CO and H$_2$O. The above equation can be expressed as multivariate (a, b, c, $E_{\lambda 1}$-$E_{\lambda n}$) simultaneous equations.

$$\begin{bmatrix} A_{2207.01} \\ A_{2207.02} \\ \vdots \\ A_{2212.00} \end{bmatrix} = \begin{bmatrix} a \\ b \\ c \end{bmatrix} \begin{bmatrix} A_{2207.01\_N2O} & A_{2207.01\_CO} & A_{2207.01\_H2O} \\ A_{2207.02\_N2O} & A_{2207.02\_CO} & A_{2207.02\_H2O} \\ \vdots & \vdots & \vdots \\ A_{2212.00\_N2O} & A_{2212.00\_CO} & A_{2212.00\_H2O} \end{bmatrix} + \begin{bmatrix} E_{2207.01} \\ E_{2207.02} \\ \vdots \\ E_{2212.00} \end{bmatrix}$$

wherein, $$\begin{bmatrix} A_{2207.01} \\ A_{2207.02} \\ \vdots \\ A_{2212.00} \end{bmatrix}$$

represents an absorption strength (A) of the mixed gas within a wavenumber range of 2207-2212 cm$^{-1}$;

$$\begin{bmatrix} A_{2207.01\_N2O} & A_{2207.01\_CO} & A_{2207.01\_H2O} \\ A_{2207.02\_N2O} & A_{2207.02\_CO} & A_{2207.02\_H2O} \\ \vdots & \vdots & \vdots \\ A_{2212.00\_N2O} & A_{2212.00\_CO} & A_{2212.00\_H2O} \end{bmatrix}$$

represents absorption strengths of target gases $N_2O$, $CO$ and $H_2O$ under the condition of specific temperature T and pressure P within a wavenumber range;

$$\begin{bmatrix} E_{2207.01} \\ E_{2207.02} \\ \vdots \\ E_{2212.00} \end{bmatrix}$$

represents a residual value (E) of the mixed gas within a wavenumber range, and the residual value (E) can be expressed as: $E=(E_{2207.01}^2+E_{2207.02}^2+\ldots+E_{2212.00}^2)^{1/2}$.

An optimum solution for the above simultaneous equations can be found and further used to find a minimum residual value (E) of each target gas in a specific matrix of temperature T and pressure P. Then, a modified concentration coefficient of each target gas is obtained according to the minimum residual value (E) of the target gas. The modified concentration coefficients are the absorption coefficients a, b and c of the target gases under the condition of specific temperature T and pressure P.

Refer to FIG. 5. When the residual value (E) is 0, the temperature and pressure of the target gas respectively are 308K and 0.95 atm. Then, refer to FIG. 6, the modified concentration coefficient of each target gas is obtained according to the temperature-pressure matrix of the target gas, wherein the modified concentration coefficients a, b and c of the target gases $N_2O$, $CO$ and $H_2O$ respectively are 0.98, 0.85 and 1.00.

Then, the actual species concentration of the target gas can be obtained by multiplying the modified concentration coefficient of the target gas by the corresponding concentration value of the target gas in the spectral database. For example, the actual concentration of $N_2O$ is 0.33 ppm*0.98=0.322 ppm, the actual concentration of CO is 0.15 ppm*0.85=0.127 ppm, and actual concentration of $H_2O$ is 20,000 ppm*1.0=20,000 ppm.

If the concentration deviation due to the change in temperature or pressure is not taken into consideration, normally the wrong concentration is calculated according to the spectrum under 1 atm and 298 K, the concentrations of $N_2O$, CO and $H_2O$ after calculated are 0.301 ppm, 0.197 ppm and 24308 ppm respectively, and the deviation percentage between the wrong concentration and actual concentration for $N_2O$, CO and $H_2O$ respectively are −7%, 55% and 22%. Thus, the gas absorption spectrum measuring system 100 of the disclosure can be used in the high stable open-path QCL optical path system and can meet the requirement of correcting the temperature and pressure effect of high-resolution spectrum.

Figure 7:
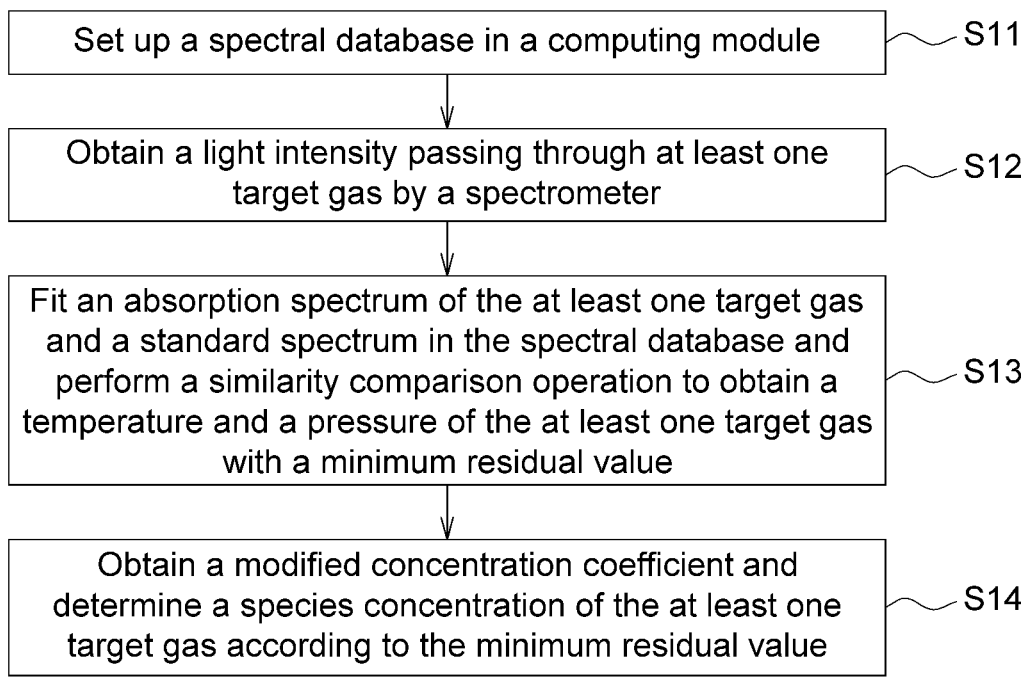
FIG. 7 is a gas absorption spectrum measuring method according to an embodiment of the disclosure.

Refer to FIGS. 1 and 7. FIG. 7 is a gas absorption spectrum measuring method according to an embodiment of the disclosure. The gas absorption spectrum measuring method includes the following steps S11-S14. In step S11, a spectral database is set up in a computing module 105. In step S12, an intensity of the light passing through at least one target gas is obtained by a spectrometer (that is, the gas absorption spectrum measuring system 100). In step S13, an absorption spectrum of the at least one target gas and a standard spectrum in the spectral database are fitted and a similarity comparison operation is performed to obtain a temperature and a pressure of the at least one target gas with a minimum residual value. In step S14, a modified concentration coefficient is obtained and a species concentration of the at least one target gas is determined according to the minimum residual value of the at least one target gas.

The computing module 105 performs a similarity comparison operation of characteristic peaks using a least square method to find a minimum residual value of the pressure and temperature matrix of the target gas and further obtain a modified concentration coefficient of the target gas and a corresponding species concentration of the target gas to reduce the deviation of concentration.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A gas absorption spectrum measuring system, used in a spectrometer to detect concentrations of multiple target gases, the system comprising:
   a light source configured to emit a light;
   a light source controller configured to regulate a wavelength of the light;
   a light intensity detector configured to detect an intensity of the light which is generated by the light source and passes through at least one target gas; and
   a computing module, comprising a numerical processor and a storage unit, wherein the storage unit is configured to store a temperature-pressure matrix spectral database, the numerical processor is configured to fit an absorption spectrum of each of the target gases and a standard spectrum in the temperature-pressure matrix spectral database and perform a similarity comparison operation to obtain absorption strengths of the target gases in corresponding wavenumber and a temperature and a pressure of the target gases with a minimum residual value, and corresponding concentration correction coefficients of the target gases are obtained according to the minimum residual value, and each of the corresponding concentration correction coefficients of the target gases are multiplied by each of the concentrations of the target gases to obtain a species concentration of each of the target gases.

2. The system according to claim 1, wherein the spectral database comprises standard spectra of multiple gases under the condition of different temperatures and pressures for the similarity comparison.

3. The system according to claim 1, wherein the spectral database is obtained based on a HITRAN database and is stored in the computing module.

4. The system according to claim 1, wherein the spectral database is obtained by extracting a corresponding absorption spectrum of each of the target gases in a gas sample tank under a given condition of a temperature, a pressure and a concentration of the target gases, and is stored in the computing module.

5. The system according to claim 1, wherein the computing module performs the similarity comparison operation of characteristic peaks using a least square method to find the minimum residual value of a temperature-pressure matrix of the target gases.

6. The system according to claim 1, wherein the light intensity detector faces the light source.

7. The system according to claim 1, further comprising a reflector configured to reflect the light reflected from the light source to the light intensity detector, wherein the reflector faces the light intensity detector.

8. The system according to claim 1, wherein the light source comprises one of Fourier transform infrared spectrometer (FTIR), tunable diode laser (TDLS), tunable semiconductor laser, quantum cascade laser (QCL), interband cascade laser (ICL), vertical cavity surface emitting laser (VCSEL), horizontal cavity surface emitting laser (HCSEL), distributed feedback laser, light emitting diode (LED), super-luminescent diode, amplified spontaneous emission source (ASE source), gas discharge laser, liquid laser, solid state laser, fiber laser, color center laser, incandescent lamp, discharge lamp, thermal emitter, frequency comb and a device capable of generating frequency tunable light through nonlinear optical interactions.

9. The system according to claim 1, wherein the light intensity detector comprises one of InGaAs detector, InAs detector, InP detector, silicon detector, SiGe detector, germanium detector, MCT detector, PbS detector, PbSe detector, thermopile detector, multi-element array detector, single element detector and photo-multiplier.

10. A gas absorption spectrum measuring method, used in an spectrometer to detect concentrations of multiple target gases, the method comprising:
    setting up a temperature-pressure matrix spectral database in a computing module;
    obtaining a light intensity passing through the target gases by the spectrometer;
    fitting a mixed spectrum of the target gases and a standard spectrum in the temperature-pressure matrix spectral database and performing a similarity comparison operation to obtain absorption strengths of the target gases in corresponding wavenumber and a temperature and a pressure of the target gases with a minimum residual value; and
    obtaining corresponding concentration correction coefficients of the target gases according to the minimum residual value, and each of the corresponding concentration correction coefficients of the target gases are multiplied by each of the concentrations of the target gases to obtain a species concentration of each of the target gases.

11. The method according to claim 10, wherein setting up the spectral database comprises obtaining standard spectra of multiple gases under a condition of different temperatures and pressures for the similarity comparison.

12. The method according to claim 10, wherein the spectral database is obtained based on a HITRAN database and is stored in the computing module.

13. The method according to claim 10, wherein the spectral database is obtained by extracting a corresponding absorption spectrum of each of the target gases in a gas sample tank under a given condition of a temperature, a pressure and a concentration of the target gases, and is stored in the computing module.

14. The method according to claim 10, wherein the computing module performs the similarity comparison operation of characteristic peaks using a least square method to find the minimum residual value of a temperature-pressure matrix of the target gases.

* * * * *